(12) United States Patent
Furukawa

(10) Patent No.: US 9,044,963 B2
(45) Date of Patent: Jun. 2, 2015

(54) LASER DRAWING CONTROL APPARATUS, LASER DRAWING APPARATUS, METHOD OF CONTROLLING LASER DRAWING APPARATUS AND COMPUTER-READABLE RECORDING MEDIUM

(75) Inventor: Takahiro Furukawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 105 days.

(21) Appl. No.: 14/001,625

(22) PCT Filed: Feb. 22, 2012

(86) PCT No.: PCT/JP2012/055010
§ 371 (c)(1),
(2), (4) Date: Aug. 26, 2013

(87) PCT Pub. No.: WO2012/118104
PCT Pub. Date: Sep. 7, 2012

(65) Prior Publication Data
US 2013/0335501 A1    Dec. 19, 2013

(30) Foreign Application Priority Data
Mar. 1, 2011    (JP) .................. 2011-044324

(51) Int. Cl.
*B41J 2/47*    (2006.01)
*B41J 2/355*    (2006.01)
(Continued)

(52) U.S. Cl.
CPC ............. *B41J 2/355* (2013.01); *B23K 26/00* (2013.01); *B41J 2/47* (2013.01); *B41J 2/4753* (2013.01); *G06K 15/1228* (2013.01); *G06K 15/128* (2013.01); *G06K 15/225* (2013.01)

(58) Field of Classification Search
USPC .......................... 347/224, 225, 233
See application file for complete search history.

(56) References Cited

U.S. PATENT DOCUMENTS 8,106,934 B2    1/2012    Ishimi et al.
8,133,652 B2 *  3/2012    Kawahara et al. ......... 430/270.1
(Continued)

FOREIGN PATENT DOCUMENTS

EP    0 494 105 A2    7/1992
JP    2004-090026    3/2004
(Continued)

OTHER PUBLICATIONS

Written opinion of the International Search Authority in PCT/JP2012/055010, issued on Sep. 3, 2013.*
(Continued)

*Primary Examiner* — Huan Tran
(74) *Attorney, Agent, or Firm* — Oblon, McClelland, Maier & Neustadt, L.L.P.

(57) ABSTRACT

Disclosed is a laser drawing control apparatus for thawing an image on an object by a laser light, including an end point shifting unit (1102) that obtains a drawing data for a single stroke drawing to be drawn on the object by the laser light, calculates a shifting amount (E1 and E2) for an end point (P1 and P2) of the single stroke thawing for extending the length of the single stroke drawing based on a predetermined scanning speed "x" set for the end point of the single stroke drawing, and updates the drawing data to shift the coordinate of the end point of the single stroke thawing based on the calculated shifting amount; and a thawing instruction generating unit (1103) that generates a drawing instruction to instruct a laser illuminator (12) based on the drawing data updated by the end point shifting unit.

11 Claims, 13 Drawing Sheets

(51) Int. Cl.
*B41J 2/475* (2006.01)
*G06K 15/12* (2006.01)
*G06K 15/22* (2006.01)
*B23K 26/00* (2014.01)

(56) References Cited

U.S. PATENT DOCUMENTS

| | | | |
|---|---|---|---|
| 8,284,226 B2* | 10/2012 | Hasegawa et al. | 347/224 |
| 8,902,267 B2* | 12/2014 | Oda | 347/252 |
| 2010/0039916 A1 | 2/2010 | Hasegawa et al. | |
| 2011/0096040 A1* | 4/2011 | Hasegawa | 345/179 |
| 2012/0038735 A1* | 2/2012 | Hasegawa | 347/217 |
| 2012/0200656 A1 | 8/2012 | Oda | |
| 2013/0182060 A1* | 7/2013 | Furukawa et al. | 347/248 |
| 2013/0242021 A1* | 9/2013 | Hasegawa | 347/171 |

FOREIGN PATENT DOCUMENTS

| | | |
|---|---|---|
| JP | 2006-306063 | 11/2006 |
| JP | 3990891 | 10/2007 |
| JP | 2007-307723 | 11/2007 |
| JP | 2008-179131 | 8/2008 |
| JP | 2008-179135 | 8/2008 |
| JP | 2011-025647 | 2/2011 |
| JP | 2011-104990 | 6/2011 |
| WO | 2011/049148 A1 | 4/2011 |

OTHER PUBLICATIONS

Extended Search Report issued Sep. 24, 2014, in European Patent Application No. 12752508.7.
International Search Report Issued May 1, 2012 in PCT/JP2012/055010 Filed on Feb. 22, 2012.

* cited by examiner

FIG.10

DRAWING DATA SET D

| number of single stroke drawings: N |
|---|

| standard scanning speed: sB1 |
|---|

| standard shifting amount at standard scanning speed: b |
|---|

N { d1:
- scanning speed of laser light: a1
- x coordinate of starting end point: x1
- y coordinate of starting end point: y1
- x coordinate of middle point: xc1
- y coordinate of middle point: yc1
- . .
- . .
- x coordinate of terminal end point: xm1
- y coordinate of terminal end point: ym1

⋮ dN:
- scanning speed of laser light: aN
- x coordinate of starting end point: xn
- y coordinate of starting end point: yn
- x coordinate of middle point: xcn
- y coordinate of middle point: ycn
- . .
- . .
- x coordinate of terminal end point: xmn
- y coordinate of terminal end point: ymn

FIG.14

DRAWING DATA SET D'

| number of single stroke drawings: N |
|---|

N {

| scanning speed of laser light: a1 |
|---|
| x coordinate of starting end point: x1+dx1 |
| y coordinate of starting end point: y1+dy1 |
| x coordinate of middle point: xc1 |
| y coordinate of middle point: yc1 |
| . . |
| . . |
| x coordinate of terminal end point: xm1+dxm1 |
| y coordinate of terminal end point: ym1+dym1 |

⋮

| scanning speed of laser light: aN |
|---|
| x coordinate of starting end point: xn+dxn |
| y coordinate of starting end point: yn+dyn |
| x coordinate of middle point: xcn |
| y coordinate of middle point: ycn |
| . . |
| . . |
| x coordinate of terminal end point: xmn+dxmn |
| y coordinate of terminal end point: ymn+dymn |

LASER DRAWING CONTROL APPARATUS, LASER DRAWING APPARATUS, METHOD OF CONTROLLING LASER DRAWING APPARATUS AND COMPUTER-READABLE RECORDING MEDIUM

TECHNICAL FIELD

The present invention relates to a laser drawing control apparatus, a laser drawing apparatus, a method of controlling a laser drawing apparatus and computer-readable recording medium and more specifically, to a laser drawing control apparatus, a laser drawing apparatus, a method of controlling a laser drawing apparatus and computer-readable recording medium for drawing an image such as a character or the like on an object by a laser light.

BACKGROUND ART

It is possible to draw an image such as a character, a mark or the like on an object such as a thermal rewritable medium or the like by irradiating a laser light (by which the temperature of the irradiated part of the object becomes high by absorbing the laser light) and heat. A laser drawing apparatus (a laser irradiating apparatus or a laser marker) using this technique has been developed and commercially available (patent document 1 to patent document 5, for example).

The laser drawing apparatus uses a gas laser, a solid laser, a liquid laser, a semiconductor laser or the like for a laser light source and an image such as a character, a mark or the like can be drawn on the object. The object may be a medium to which writing and deleting can be performed by changing the applied temperature. The object may be capable of being repeatedly used, such as a metal, a plastic, a thermal paper, a thermal rewritable medium or the like by the oscillatory wavelength of the laser light.

For the metal or the plastic, the image can be drawn by ablating or baking by irradiating the laser light to heat the surface of the object. For the thermal paper or the thermal rewritable medium, the image can be drawn by developing color of a recording layer by irradiating the laser light to heat the recording layer of the object.

FIG. 1 is an explanatory view for explaining drawing of a single stroke drawing by irradiating a laser light. Here, the single stroke drawing is a line segment.

In FIG. 1, the center of the laser light is moved (or scanned) from the first end point P1 to the second end point P2 to draw a line segment. The circle shown around the center of the laser light is an outline of the beam of the laser light. For this case, as the part of the object where the beam of the laser light is irradiated is heated, the length of the drawn line segment is expected to be L from the outer edge (left side edge) of the beam at the first end point P1 to the outer edge (right side edge) at the second end point P2.

As shown by the dotted lines in FIG. 1, the beam of the laser light is irradiated to continuously overlap as the center of the laser light is moved (or scanned) at the part other than the edges of the line segment. Therefore, although the heat diffuses toward the direction where the beam of the laser light is not irradiated, the object is heated enough to be ablated or baked when the object is the metal or the plastic, or to develop color when the object is the thermal paper or the thermal rewritable medium at the part where the beam of the laser light is irradiated to overlap.

However, the temperature at the edges of the line segment, where the beam of the laser light is not irradiated to overlap, may not become high enough to be ablated or baked when the object is the metal or the plastic, or to develop color when the object is the thermal paper or the thermal rewritable medium. As a result, the line segment is not drawn at the edges which are intended to be drawn so that the length of the line segment becomes L' which is shorter than the intended length L, reducing drawing quality.

It is described in Patent document 5 that the edges of a line segment are extended by extending the length of irradiating a laser light for a certain fixed length to reduce the influence of the above problem. However, it is difficult to appropriately extend the length of the line segment by extending the length of irradiating the laser light for a fixed length.

The present inventors have found that the shortened length of the line segment may differ based on characteristics of the object or the scanning speed of the laser light.

PATENT DOCUMENTS

[Patent document 1] Japanese Laid-open Patent Publication No. 2004-90026
[Patent document 2] Japanese Laid-open Patent Publication No. 2006-306063
[Patent document 3] U.S. Pat. No. 3,990,891
[Patent document 4] Japanese Laid-open Patent Publication No. 2008-179135
[Patent document 5] Japanese Laid-open Patent Publication No. 2011-25647

SUMMARY OF INVENTION

The present invention is made in light of the above problems, and provides a laser drawing control apparatus, a laser drawing apparatus, a method of controlling a laser drawing apparatus and computer-readable recording medium by which the length of a single stroke drawing is appropriately extended based on the characteristics of the object or the scanning speed of the laser light to improve the drawing quality.

According to an embodiment, there is provided a laser drawing control apparatus for drawing an image on an object by a laser light, including: an end point shifting unit that obtains a drawing data for a single stroke drawing to be drawn on the object by the laser light, calculates a shifting amount for an end point of the single stroke drawing for extending the length of the single stroke drawing based on a predetermined scanning speed "x" set for the end point of the single stroke drawing, and updates the drawing data to shift the coordinate of the end point of the single stroke drawing based on the calculated shifting amount; and a drawing instruction generating unit that generates a drawing instruction to instruct a laser illuminator based on the drawing data updated by the end point shifting unit so that the laser illuminator irradiates the laser light on the object at the predetermined speed "x".

According to another embodiment, there is provided a laser drawing apparatus by which the image is drawn on the object by the laser light, including: the laser drawing control apparatus; and a laser illuminator that emits the laser light to irradiate the laser light on the object at the predetermined speed "x".

According to another embodiment, there is provided a method of controlling a laser drawing apparatus for drawing an image on an object by a laser light, including: obtaining drawing data for drawing a single stroke drawing on the object by the laser light; calculating a shifting amount for an end point of the single stroke drawing for extending the length of the single stroke drawing based on a predetermined scanning speed "x" set for the end point of the single stroke drawing; updating the drawing data to shift the coordinate of the end point of the single stroke drawing based on the calculated shifting amounts; and generating a drawing instruction to instruct a laser illuminator based on the updated drawing data so that the laser illuminator irradiates the laser light on the object at the predetermined speed "x".

According to another embodiment, there is provided a non-transitory computer-readable recording medium having recorded thereon a program that causes a laser drawing apparatus for drawing an image on an object by a laser light, to execute a method including: obtaining drawing data for drawing a single stroke drawing on the object by the laser light; calculating a shifting amount for an end point of the single stroke drawing for extending the length of the single stroke drawing based on a predetermined scanning speed "x" set for the end point of the single stroke drawing; updating the drawing data to shift the coordinate of the end point of the single stroke drawing based on the calculated shifting amounts; and generating a drawing instruction to instruct a laser illuminator based on the updated drawing data so that the laser illuminator irradiates the laser light on the object at the predetermined speed "x".

According to the laser drawing control apparatus, the length of the drawn single stroke drawing can be appropriately extended based on the characteristic of the object or the scanning speed of the laser light to improve the drawing quality.

BRIEF DESCRIPTION OF DRAWINGS

Other objects, features and advantages of the present invention will become more apparent from the following detailed description when read in conjunction with the accompanying drawings.

FIG. 10 shows an example of a drawing data set;

FIG. 14 shows an example of an updated drawing data set.

DESCRIPTION OF EMBODIMENTS

Figure 1:
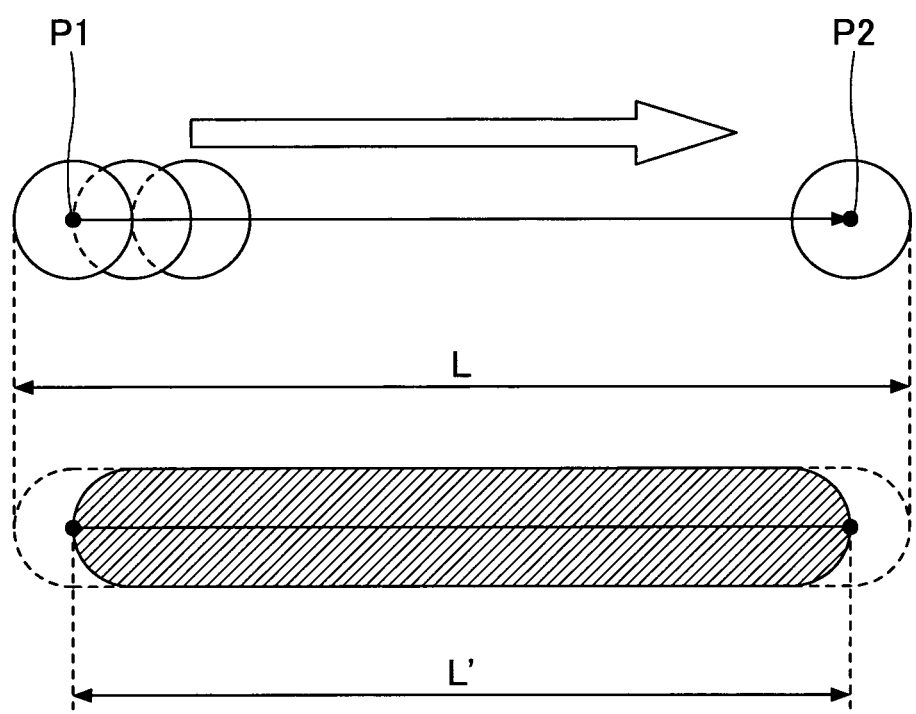
FIG. 1 is an explanatory view for explaining drawing of a single stroke drawing by irradiating a laser light.

The invention will be described herein with reference to illustrative embodiments. Those skilled in the art will recognize that many alternative embodiments can be accomplished using the teachings of the present invention and that the invention is not limited to the embodiments illustrated for explanatory purposes.

Next, embodiments of the present invention will be described below with reference to drawings.

It is to be noted that, in the explanation of the drawings, the same components are given the same reference numerals, and explanations are not repeated.

<Extending a Single Stroke Drawing>

Figure 2:
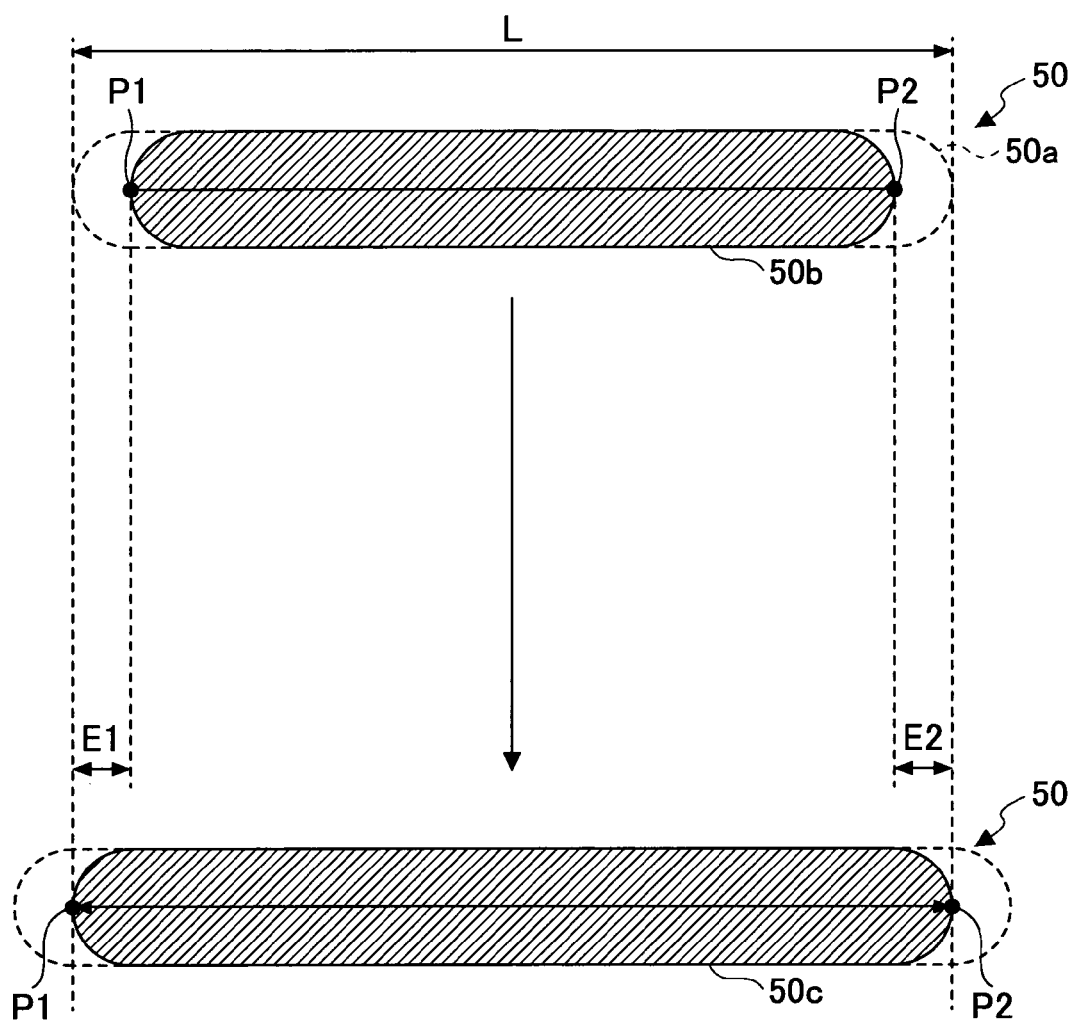
FIG. 2 is an explanatory view for explaining extending a single stroke drawing.

FIG. 2 is an explanatory view for explaining extending a single stroke drawing when the single stroke drawing is a line segment 50.

When the line segment 50 designated by a first end point P1 and a second end point P2 as shown in FIG. 2 is to be drawn by the laser light, it is intended to be drawn as the line segment 50a shown by the dotted line having a length L defined by the first end point P1, the second end point P2 and the radius of the beam of the laser light.

However, by the reason as explained above with reference to FIG. 1, the length of the drawn line segment 50b shown by the hatched area may become shorter than the intended length L.

Therefore, according to the embodiment, the first end point P1 is shifted outward of the line segment 50 (leftward in FIG. 2) for E1 on an extending line of the line segment 50 and the second end point P2 is shifted outward of the line segment (rightward in FIG. 2) for E2 on the extending line of the line segment 50 to extend the length of the drawn line segment 50 so that the length of the drawn line segment 50c shown by the hatched area becomes L.

The operation for processing drawing data for shifting end points will be explained later in detail. Further, shifting amounts E1 and E2 for the first end point P1 and the second end point P2 will be explained later in detail as well.

Figure 3A:
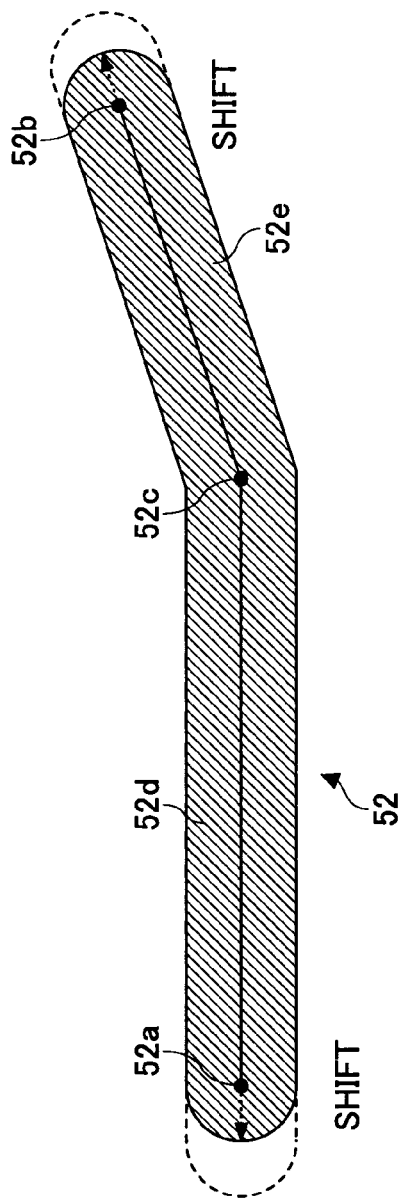
FIG. 3A and FIG. 3B show examples of a single stroke drawing having a middle point.
Figure 3B:
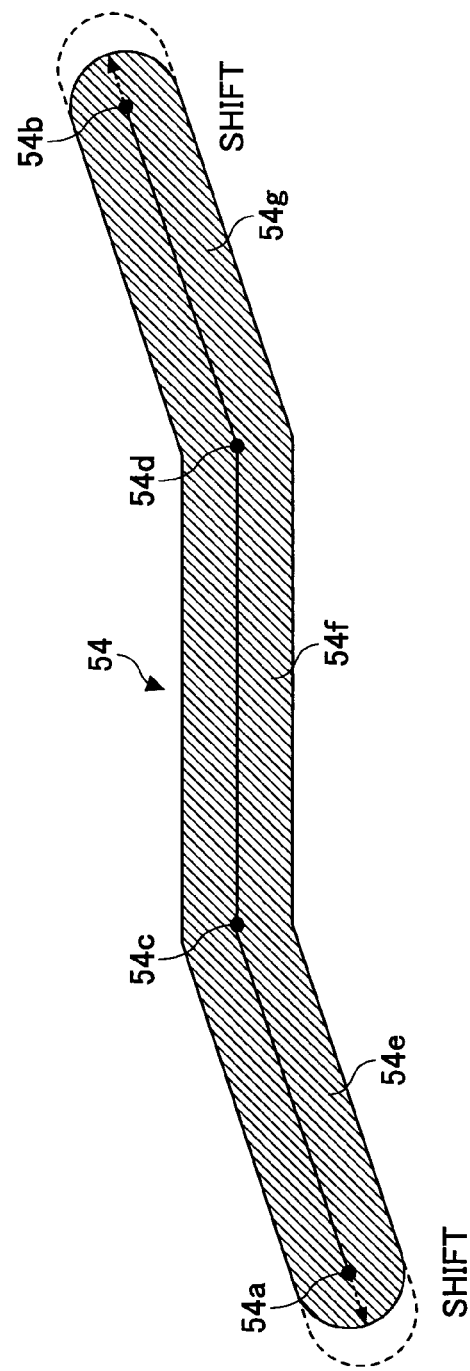

FIG. 3A and FIG. 3B show examples of a single stroke drawing having a middle point.

The single stroke drawing means a unit of drawing for which the laser light is continuously irradiated without an intermission. The single stroke drawing may be composed of a single line segment or may be composed of plural line segments. When the single stroke drawing is composed of plural line segments, a terminal point of a preceding line segment becomes a starting point of a next line segment, and the same relationships are applied for the subsequent line segments.

FIG. 3A shows a single stroke drawing 52 composed of two line segments 52d and 52e connected with each other to have two end points 52a and 52b and a middle point 52c.

When the single stroke drawing 52 designated by the end point 52a, the middle point 52c and the end point 52b is to be drawn by the laser light, it is intended to be drawn as the hatched area defined by the end point 52a, the middle point 52c, the end point 52b and the diameter of the beam of the laser light.

However, as described above, the single stroke drawing 52 may not be appropriately drawn at the edges respectively near the end points 52a and 52b.

For this case, as the laser light is continuously irradiated from the line segment 52d to the line segment 52e, the single stroke drawing 52 can be drawn as it is intended at the middle point 52c.

Therefore, only the end points 52a and 52b are shifted to extend the length of the single stroke drawing 52 at its edges to have the intended shape.

Further, if the terminal end (which is the middle point 52c) of the line segment 52d, or the starting end (which is also the middle point 52c) of the line segment 52e are also shifted to extend the respective line segments, there may be an unnecessary overlap area where the laser light is irradiated too much causing an overheat or the deformation of the shape of the single stroke drawing 52 may occur.

Similarly, FIG. 3B shows a single stroke drawing 54 composed of three line segments 54e, 54f and 54g respectively connected with each other to have two end points 54a and 54b and two middle points 54c and 54d.

For this case as well, only the end points 54a and 54b are shifted to extend the length of the single stroke drawing 54 at its edges to have the intended shape.

Figure 4:
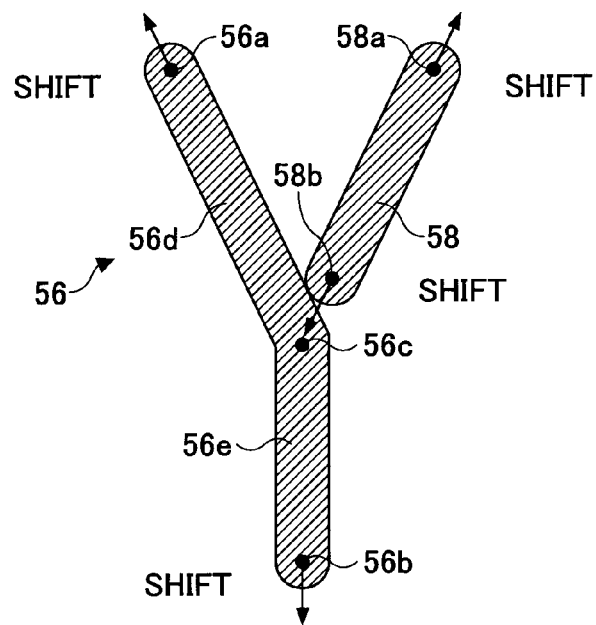
FIG. 4 shows an example of a drawing of a character showing "Y"

FIG. 4 shows an example of a drawing of a character showing "Y".

Here, the drawing includes a single stroke drawing 56 and a single stroke drawing 58. The single stroke drawing 56 is composed of a line segment 56d designated by an end point 56a at the left and upper position and a middle point 56c at the center, and a line segment 56e designated by the middle point 56c and an end point 56b at the downward. The single stroke drawing 58 is composed of a line segment designated by an end point 58a at the right and upper position and an end point 58b at the center position.

For this case, the end points 56a and 56b of the single stroke drawing 56 are shifted to extend the length of the single stroke drawing 56 to have the intended shape. However, the middle point 56c of the single stroke drawing 56, which is at the connecting point of the line segment 56d and the line segment 56e, is not shifted. The end points 58a and 58b of the single stroke drawing 58 are shifted to extend the length of the single stroke drawing 58 to have the intended shape as well.

Figure 5:
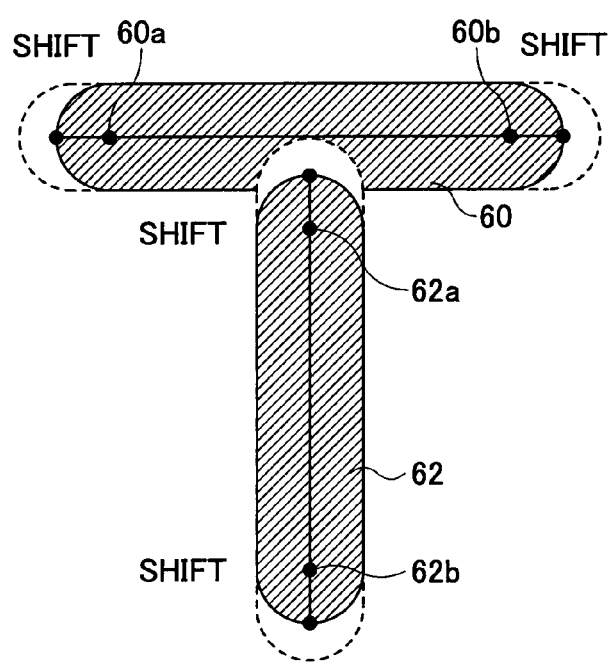
FIG. 5 shows another example of a drawing of a character showing "T"

FIG. 5 shows another example of a drawing of a character showing "T".

Here, the drawing includes a single stroke drawing 60 and a single stroke drawing 62. The single stroke drawing 60 is composed of a line segment extending designated by an end point 60a at leftward and an end point 60b at rightward. The single stroke drawing 62 composed of a line segment designated by an end point 62a at upward and the center of the line segment of the single stroke drawing 60, and an end point 62b at downward.

For this case, the end points 60a and 60b of the single stroke drawing 60 are shifted to extend the length of the single stroke drawing 60 to have the intended shape. Similarly, the end points 62a and 62b of the single stroke drawing 62 are shifted to extend the length of the single stroke drawing 62 to have the intended shape.

By shifting the end point 62a of the single stroke drawing 62 upward to extend the single stroke drawing 62, there may be a part where the beam of the laser light is irradiated twice when drawing the single stroke drawing 60 and when drawing the single stroke drawing 62. However, it is not continuously irradiated so that the temperature may not become so high as to damage the object.

Figure 6A:
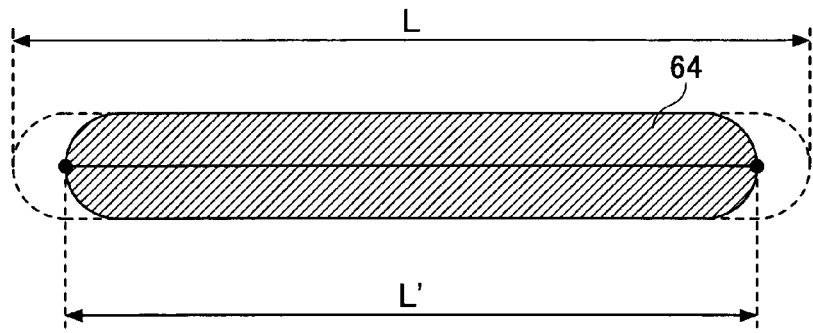
FIG. 6A, FIG. 6B and FIG. 6C are explanatory views for explaining a relationship between a scanning speed of the laser light and a shifting amount for an end point.
Figure 6B:
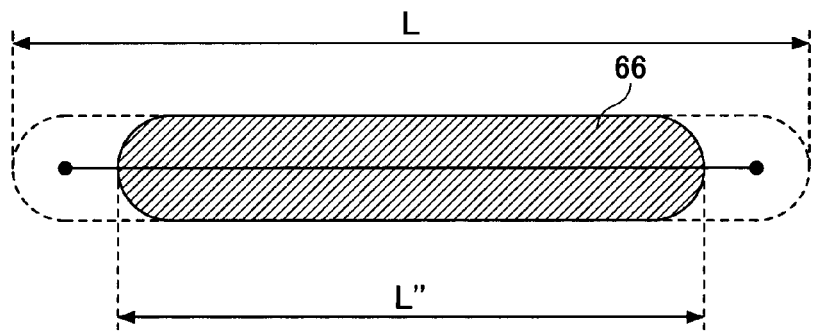
Figure 6C:
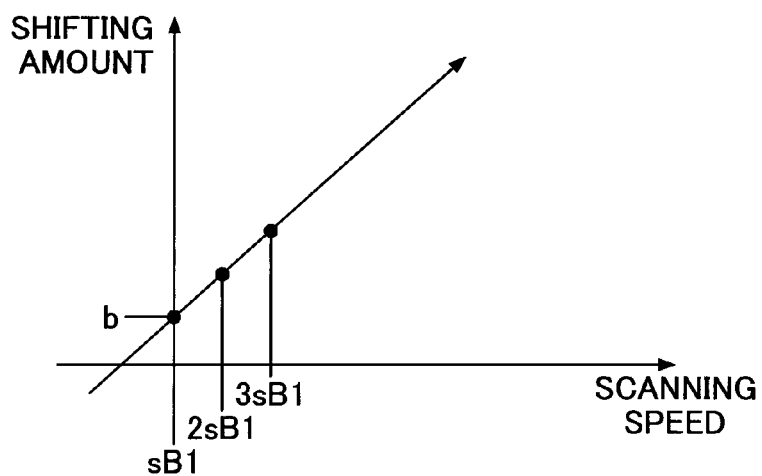

FIG. 6A, FIG. 6B and FIG. 6C are explanatory views for explaining a relationship between a scanning speed of the laser light and a shifting amount for an end point.

FIG. 6A shows an example of a single stroke drawing of a line segment 64 drawn at a predetermined scanning speed of the laser light. It is assumed that the drawn line segment 64 shown by the hatched area has length L' although it is intended to have length L (L'<L) based on drawing data.

Further, when the scanning speed of the laser light becomes twice as fast as the predetermined scanning speed, length of the drawn line segment 66 shown by the hatched area becomes shorter length L" (L"<L') although it is intended to have length L based on the drawing data.

It means that the line segment 64 shown by the hatched area in FIG. 6A and the line segment 66 shown by the hatched area in FIG. 6B are drawn based on the same drawing data by irradiating the laser light at the different speeds.

Therefore, when the scanning speed of the laser light becomes faster, it is necessary to increase the shifting amount for end points of a single stroke drawing in accordance with the scanning speed of the laser light.

FIG. 6C shows a relationship between a scanning speed of the laser light and a shifting amount for an end point.

The shortened length at an edge of a single stroke drawing, in other words, the length between the intended edge and the drawn edge, linearly varies with respect to the scanning speed of the laser light. Therefore, the amount for shifting the end point to extend the length of the single stroke drawing is also linearly varied with respect to the scanning speed of the laser light as shown in FIG. 6C.

The relationship between the shifting amount to the scanning speed of the laser light for the end point (a slope "r" of a line expressing a relationship between the shifting amount to the scanning speed) for a targeted object can be previously obtained as follows, for example. The relationship may also be obtained for a kind of a targeted laser drawing apparatus as well.

First, a standard scanning speed sB1 for the targeted laser drawing apparatus and the targeted object may be determined based on the laser power value (drawing power value) of the targeted laser drawing apparatus and characteristics such as sensitivity, for example, of the targeted object.

Then, a shifting amount "b" at the standard scanning speed "sB1" for the targeted laser drawing apparatus and the targeted object is obtained by measurements or the like.

Subsequently, based on the standard scanning speed "sB1" and the shifting amount "b", the slope "r" of the line of the relationship between the shifting amount to the scanning speed of the laser light for the end point of the targeted laser drawing apparatus and the targeted object as shown in FIG. 6C can be obtained. It is assumed that the shifting amount becomes zero when the scanning speed is zero.

In this case, the slope "r" is expressed as an equation "r=b/sB1".

The shifting amount at the scanning speed 2sB1 (twice of the standard speed sB1) or at scanning speed 3sB1 (three times of the standard speed sB1) or the like can be obtained using the equation for example.

It means that the relationship between the shifting amount to the scanning speed of the laser light for the end point (reference data) as shown in FIG. 6C may be prepared for each of the targeted laser drawing apparatuses and the targeted objects.

Alternatively, the slope "r" of the line and the shifting amount when the scanning speed is zero may be obtained to draw the line by measuring a plurality of sets of the scanning speed and the shifting amount of different scanning speeds to obtain an accurate value without assuming that the shifting amount at the scanning speed zero becomes zero.

By the relationship between the shifting amount to the scanning speed of the laser light obtained above, the shifting amount for an end point at a predetermined scanning speed "x" can be obtained as follows. As described above, two end points (not including a middle point) at the edges of a single stroke drawing are shifted.

A method 1 in which the shifting amount for end points at both edges of the single stroke drawing are the same is explained.

The shifting amount "bx" for the end points at the predetermined scanning speed "x" in this case can be obtained by the following equation based on the standard scanning speed "sB1" (m/s), the standard shifting amount "b" (mm), the slope "r" and the predetermined scanning speed "x" (m/s) as follows.

shifting amount $bx = r(x-sB1)+b$ (mm)

Alternatively, when the shifting amount is assumed as zero when the scanning speed is zero, the slope "r" can be expressed as r=b/sB1, as described above, the shifting amount "bx" for the end points may be obtained by the following equation based on the standard scanning speed "sB1" (m/s), the standard shifting amount "b" (mm) and the predetermined scanning speed "x" as follows. The value may be round-off.

shifting amount $bx = (x/sB1)b$ (mm)

A method 2 in which the shifting amounts for end points at both edges of the single stroke drawing are independently determined is explained.

When the predetermined scanning speeds at the end points at both edges of the single stroke drawing are different, this method may be used.

The predetermined scanning speed of the laser light at an end point A, which is one of the end points at the edges of the single stroke drawing, is assumed as "$x_A$" (m/s).

The shifting amount "$bx_A$" for the end point A in this case can be obtained by the following equation based on the standard scanning speed "sB1" (m/s), the standard shifting amount "b" (mm), the slope "r" and the predetermined scanning speed "$x_A$" as follows.

shifting amount $bx_A = r(x_A-sB1)+b$ (mm)

The scanning speed of the laser light at an end point B, which is the other of the end points at the edges of the single stroke drawing, is assumed as "$x_B$" (m/s).

The shifting amount "$bx_B$" for the end point B in this case can be obtained by the following equation based on the standard scanning speed "sB1" (m/s), the standard shifting amount "b" (mm), the slope "r" and the predetermined scanning speed "$x_B$" as follows.

shifting amount $bx_B = r(x_B-sB1)+b$ (mm)

Alternatively, when the shifting amount is assumed as zero when the scanning speed is zero, the slope "r" can be expressed as r=b/sB1, as described above, the shifting amount "$bx_A$" for the end point A in this case may be obtained by the following equation based on the standard scanning speed "sB1" (m/s), the standard shifting amount "b" (mm) and the predetermined scanning speed "$x_A$" as follows. The value may be round-off.

shifting amount $bx_A = (x_A/sB1)b$ (mm)

Similarly, when the shifting amount is assumed as zero when the scanning speed is zero, the slope "r" can be expressed as r=b/sB1, as described above, the shifting amount "$bx_B$" for the end point B in this case may be obtained by the following equation based on the standard scanning speed "sB1" (m/s), the standard shifting amount "b" (mm) and the predetermined scanning speed "$x_B$" as follows. The value may be round-off.

shifting amount $bx_B = (x_B/sB1)b$ (mm)

<System Structure>

Figure 7:
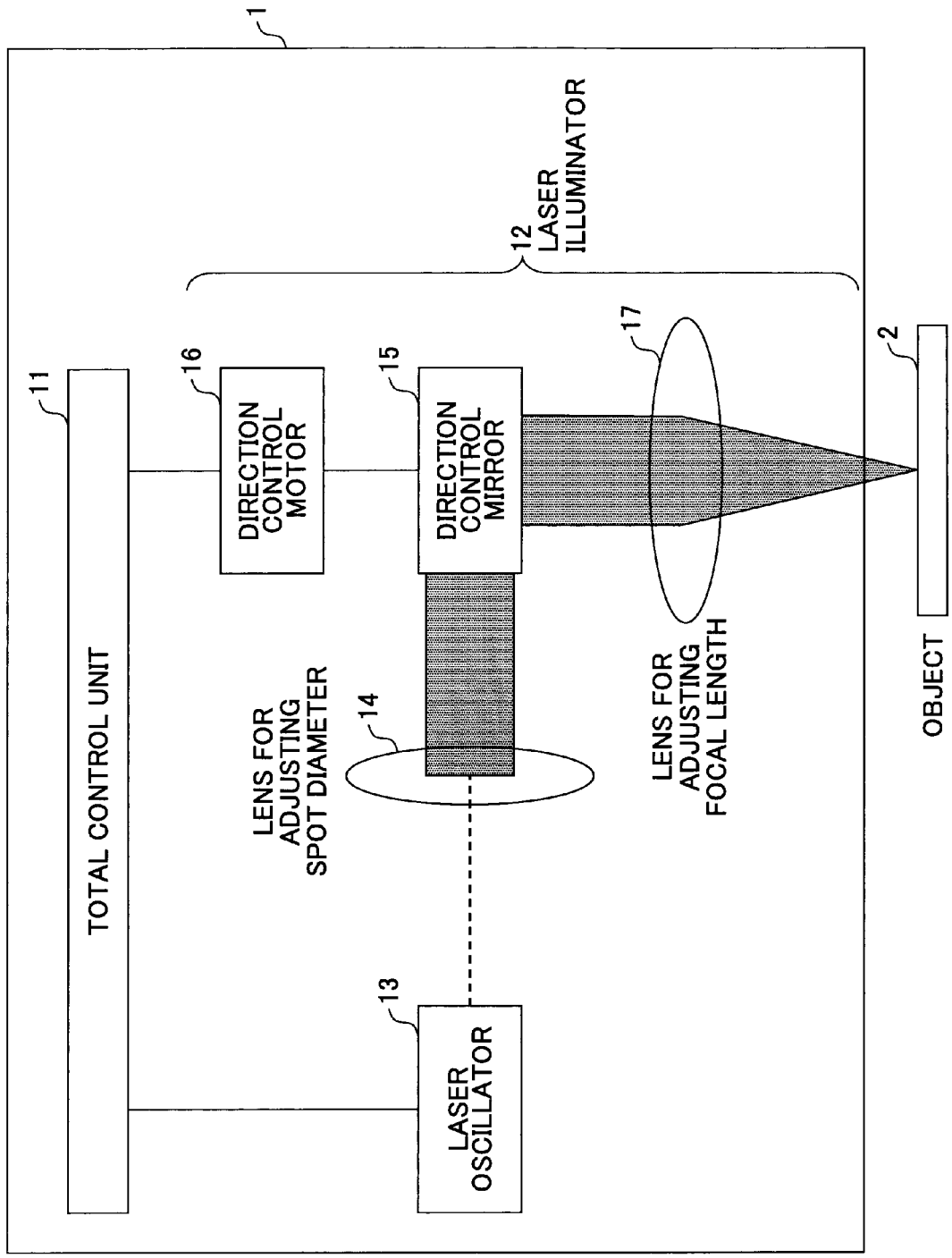
FIG. 7 is a drawing showing an example of a structure of a laser drawing apparatus.

FIG. 7 is a drawing showing an example of the structure of the laser drawing apparatus 1.

The laser drawing apparatus 1 includes a total control unit 11 (laser drawing control apparatus) that controls the entirety of the laser drawing apparatus 1, and a laser illuminator 12 that irradiates a laser light. The laser illuminator 12 includes a laser oscillator 13, a lens for adjusting spot diameter 14, a direction control mirror (movable mirror) 15, a direction control motor 16 and a lens for adjusting focal length 17.

The laser oscillator 13 generates and emits a laser light. The lens for adjusting spot diameter 14 adjusts the spot diameter of the laser light to increase the spot diameter of the laser light. The direction control mirror 15 changes the direction of the laser light. The direction control motor 16 moves the direction control mirror 15. The lens for adjusting focal length 17 adjusts the focal point of the laser light the direction of which is changed by the direction control mirror 15 on the object 2.

When the object 2 is a thermal paper or a thermal rewritable medium, the laser oscillator 13 may generally be a semiconductor laser (laser diode (LD)). The laser oscillator 13 may be a gas laser oscillator, a solid laser oscillator, a liquid laser oscillator or the like in accordance with the kind of the object 2. The direction control motor 16 may be a servo motor, for example, that controls the direction of the reflector of the direction control mirror 15 in biaxial directions. The direction control motor 16 and the direction control mirror 15 may compose a galvanometer mirror.

The object 2 may be a thermal rewritable medium such as a rewritable thermal type paper, for example, where leuco dyes and developers are formed as films with a separated condition. When a heat having a predetermined temperature "Ta" is applied and then rapidly cooled, the leuco dyes and the thermal rewritable medium are coupled to show color. Further, when a temperature "Tb" which is lower than the predetermined temperature "Ta" is applied to the thermal rewritable medium, the leuco dyes and the developers are separated so that the color disappear.

Figure 8:
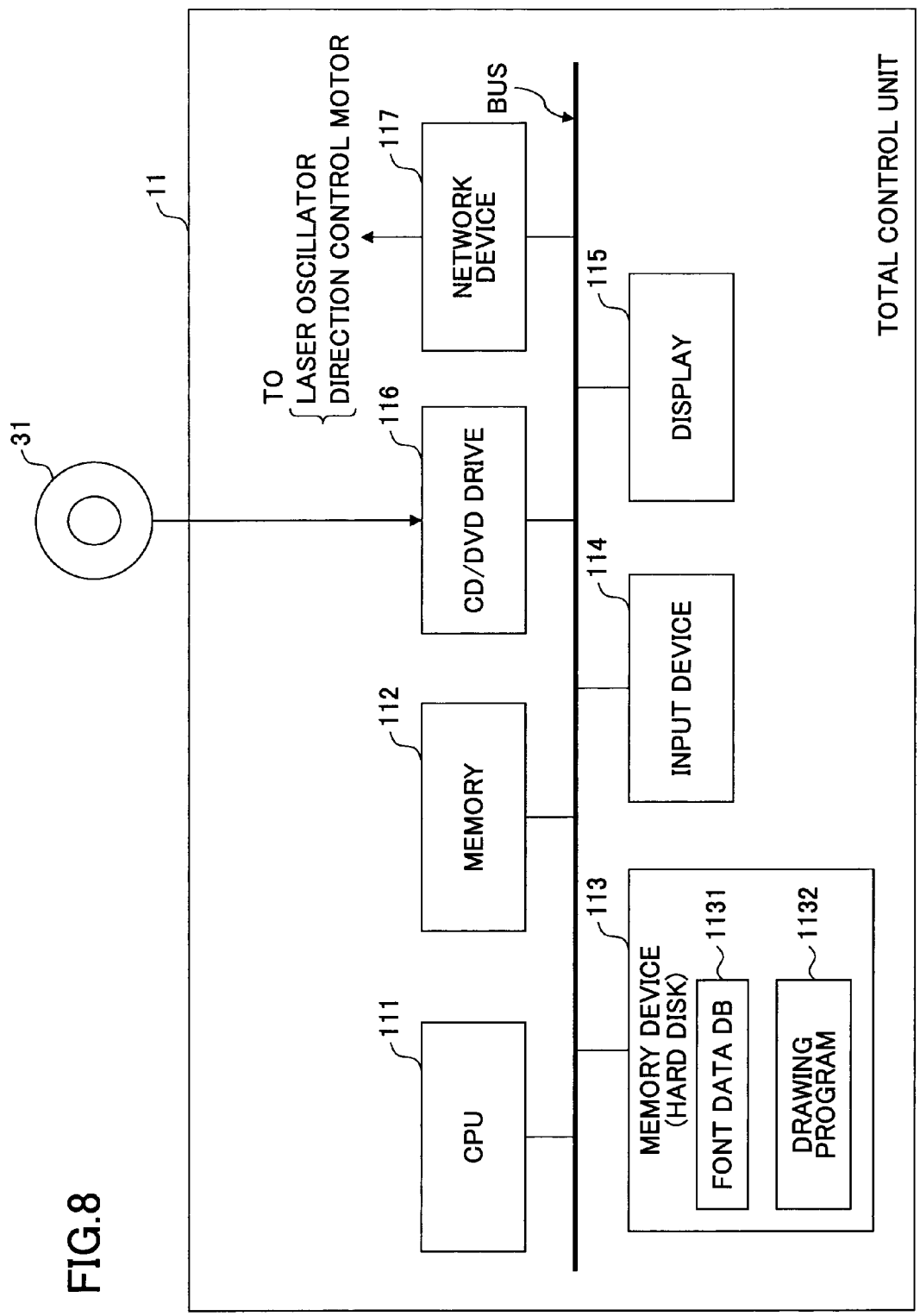
FIG. 8 is a block diagram showing an example of a structure of a total control unit.

FIG. 8 is a block diagram showing an example of the structure of the total control unit 11. FIG. 8 shows hardware structures of the total control unit 11. The total control unit 11 may be actualized by a computer. Alternatively, an IC such as an Application Specific Integrated Circuit (ASIC) or the like manufactured for a specific function for the total control unit 11 may be used.

The total control unit 11 includes a CPU 111, a memory 112, a memory device 113, an input device 114, a display 115, a CD/DVD drive 116, a network device 117 and a BUS. The memory device 113 may be a hard disk or the like. The memory device 113 stores a font data database (font data DB) 1131 and a drawing program 1132. The font data DB 1131 stores font data including characters of stroke font and outline font. The drawing program 1132 generates a drawing instruction in which the overlapped portion of a character is deleted and controls the laser illuminator 12 (see FIG. 7).

The CPU 111 reads out the drawing program 1132 from the memory device 113 and executes the drawing program 1132 for drawing an image such as a character or the like on the object 2 in accordance with a method explained later. The memory 112 may be a volatile memory such as a dynamic random-access memory (DRAM). The memory 112 provides a working area for the CPU 111 to execute the drawing program 1132.

The input device 114 may be a mouse or a keyboard for which a user can input instruction for controlling the laser illuminator 12. The display 115 functions as a user interface that displays a Graphical User Interface (GUI) screen with a predetermined resolution and color based on screen information provided by the drawing program 1132. The display 115 displays a screen including an input area to input an image such as a character or the like to be drawn on the object 2 or the like, for example.

The CD/DVD drive 116 is configured to detachably receive a medium such as a CD/DVD 31. When the CD/DVD 31 is inserted, the CD/DVD drive 116 reads out data from the CD/DVD 31 or writes data to the CD/DVD 31.

The font data DB 1131 and the drawing program 1132 may be provided as data stored in the CD/DVD 31, and installed in the memory device 113 after being read out from the CD/DVD 31. The CD/DVD 31 may be altered by another non-volatile memory such as a Blu-ray Disc, a SD memory card, a Memory Stick (registered trademark), a multimedia card, an xD-picture card or the like.

The network device 117 is an interface such as an Ethernet (registered trademark) card or the like for connecting to a network such as a LAN, INTERNET or the like, for example. The network device 117 is configured to execute an operation in accordance with a protocol defined by the physical layer or the data link layer of the OSI Reference Model. The network device 117 may download the font data DB 1131 and the drawing program 1132 from a predetermined server via the network.

The network device 117 may enable the total control unit 11 to send and receive data between the laser illuminator 12. The network device 117 may send a drawing instruction corresponding to character codes, for example to the laser illuminator 12.

The total control unit 11 and the laser illuminator 12 may be connected via a Universal Serial Bus (USB), IEEE1394, a wireless USB, Bluetooth or the like instead of using the network.

The characters to be drawn on the object 2 may be stored in a form of list in the memory device 113, or input from the input device 114. The characters are specified by a character code such as UNICODE or JIS code. The total control unit 11 reads out the font data corresponding to the character code from the font data DB 1131 and transforms the data to the drawing instruction to control the laser illuminator 12.

Figure 9:
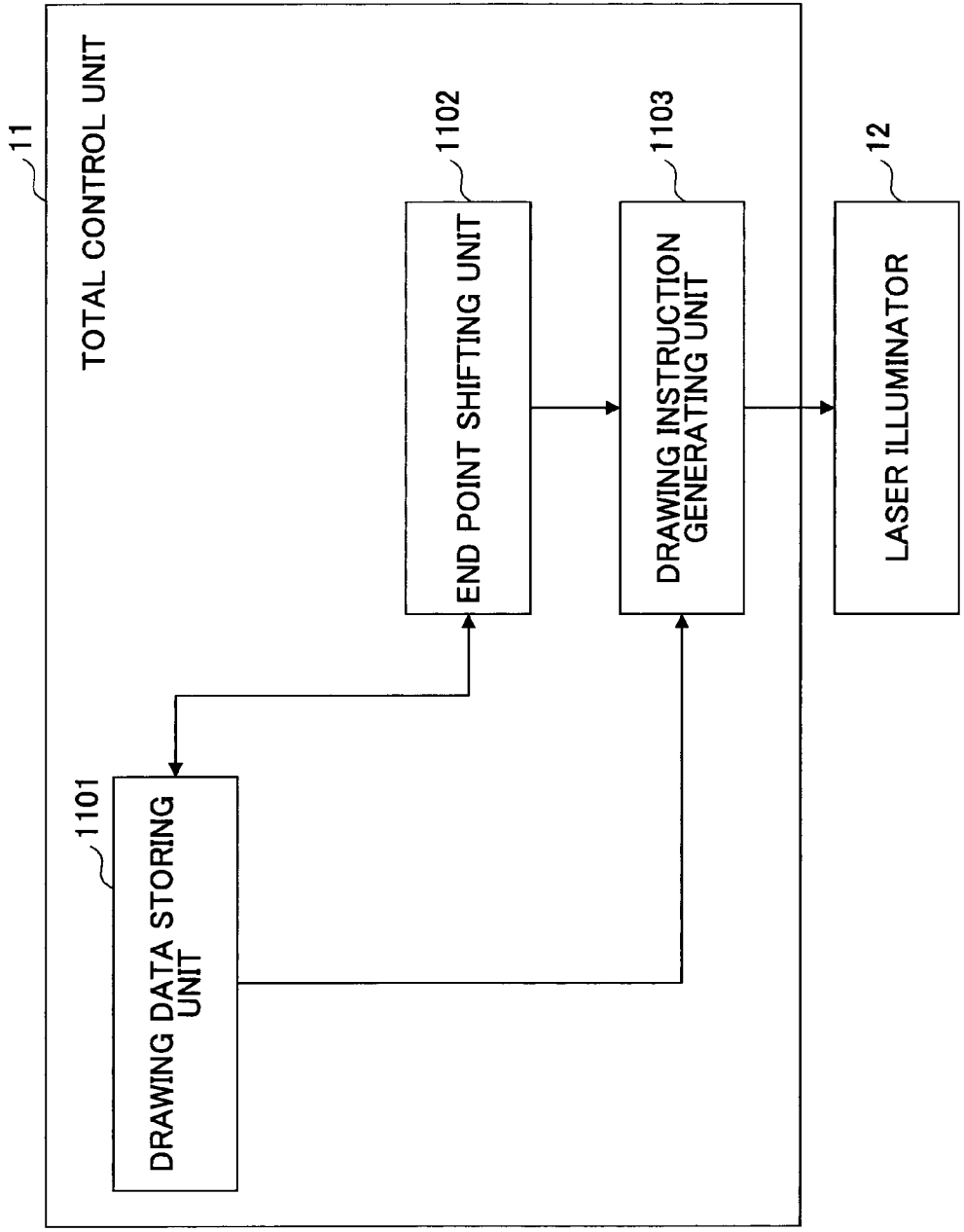
FIG. 9 is a block diagram showing an example of main functional blocks of the total control unit.

FIG. 9 is a block diagram showing an example of main functional blocks of the total control unit 11.

The total control unit 11 includes a drawing data storing unit 1101, an end point shifting unit 1102 and a drawing instruction generating unit 1103. The drawing data storing unit 1101 may be included in the memory device 113 shown in FIG. 8.

The drawing data storing unit 1101 stores a drawing data set for a single stroke drawing or plural single stroke drawings which compose an image such as characters, marks, pictures or the like to be drawn on the object 2.

In this embodiment, the drawing data set includes reference data that expresses a relationship between a scanning speed and a shifting amount set for the object and the laser drawing apparatus. The reference data may be, a set of the standard scanning speed "sB1" (m/s), the standard shifting amount "b" (mm), the slope "r" and the predetermined scanning speed "x", or a set of the standard scanning speed "sB1" (m/s), the standard shifting amount "b" (mm) and the predetermined scanning speed "x".

FIG. 10 shows an example of a drawing data set D. The drawing data set D includes individual drawing data do (n=1 to N) for drawing plural (N) single stroke drawings, respectively. The drawing data set D includes "the number of single stroke drawings (N)", "the standard scanning speed (sB1)", "the standard shifting amount (b) at the standard scanning speed (sB1)" and individual drawing data (dn) for the plural (N) single stroke drawings. Each of the individual drawing data "dn" corresponds to a single stroke drawing.

Each of the individual drawing data "dn" is composed of "the scanning speed of the laser light (an)", "x coordinate of a starting end point (xn)", "y coordinate of a starting end point (yn)", "x coordinate of a middle point (xcn)", "y coordinate of a middle point (ycn)", "x coordinate of a terminal end point (xmn)" and "y coordinate of a terminal end point (ymn)" (where n=1 to N). The number of middle points is different for each of the individual drawing data "dn" and may not be included.

Although in this case, a scanning speed (predetermined scanning speed) is set for each of the individual drawing data "dn" to meet the requirement for the method 1 as described above to obtain the shifting amount for the end points, the individual drawing data "dn" may include two scanning speeds corresponding to the starting end point and the terminal end point to obtain the shifting amount in accordance with the method 2 as explained above.

In this embodiment, "the standard scanning speed (sB1)", "the standard shifting amount (b) at the standard scanning speed (sB1)", and "the scanning speed of the laser light (an)" of each of the individual drawing data "dn" are included as the reference data.

Referring back to FIG. 9, the end point shifting unit 1102 has a function to shift (or alter) the coordinates of the starting end point and the terminal end point, not including the middle point, of each of the individual drawing data corresponding to each of the single stroke drawings stored in the drawing data storing unit 1101.

The end point shifting unit 1102 obtains the drawing data set D, calculates a shifting amount for the end points (the starting end point and the terminal end point) of the single stroke drawing for extending the length of the single stroke drawing based on a predetermined scanning speed "x" set for the end points of the single stroke drawing, and updates the drawing data set D to shift the coordinates of the end points of the single stroke drawing based on the calculated shifting amounts.

Concretely, the end point shifting unit 1102 obtains the reference data and calculates the shifting amount for the end points of the single stroke drawing based on the reference data and the predetermined scanning speed "x" (the scanning speed "an" for the case shown in FIG. 10) in accordance with the method 1 or the method 2 as described above.

The drawing instruction generating unit 1103 has a function to generate a drawing instruction (laser control data) interpretable and executable by the laser illuminator 12 based on the drawing data set D' (which is an updated drawing data set of the drawing data set D, as will be explained later with reference to FIG. 14) updated by the end point shifting unit 1102 so that the laser illuminator 12 irradiates the laser light on the object 2 at the predetermined speed "x" (the scanning speed "an" for the case shown in FIG. 10).

<Operation>

Figure 11:
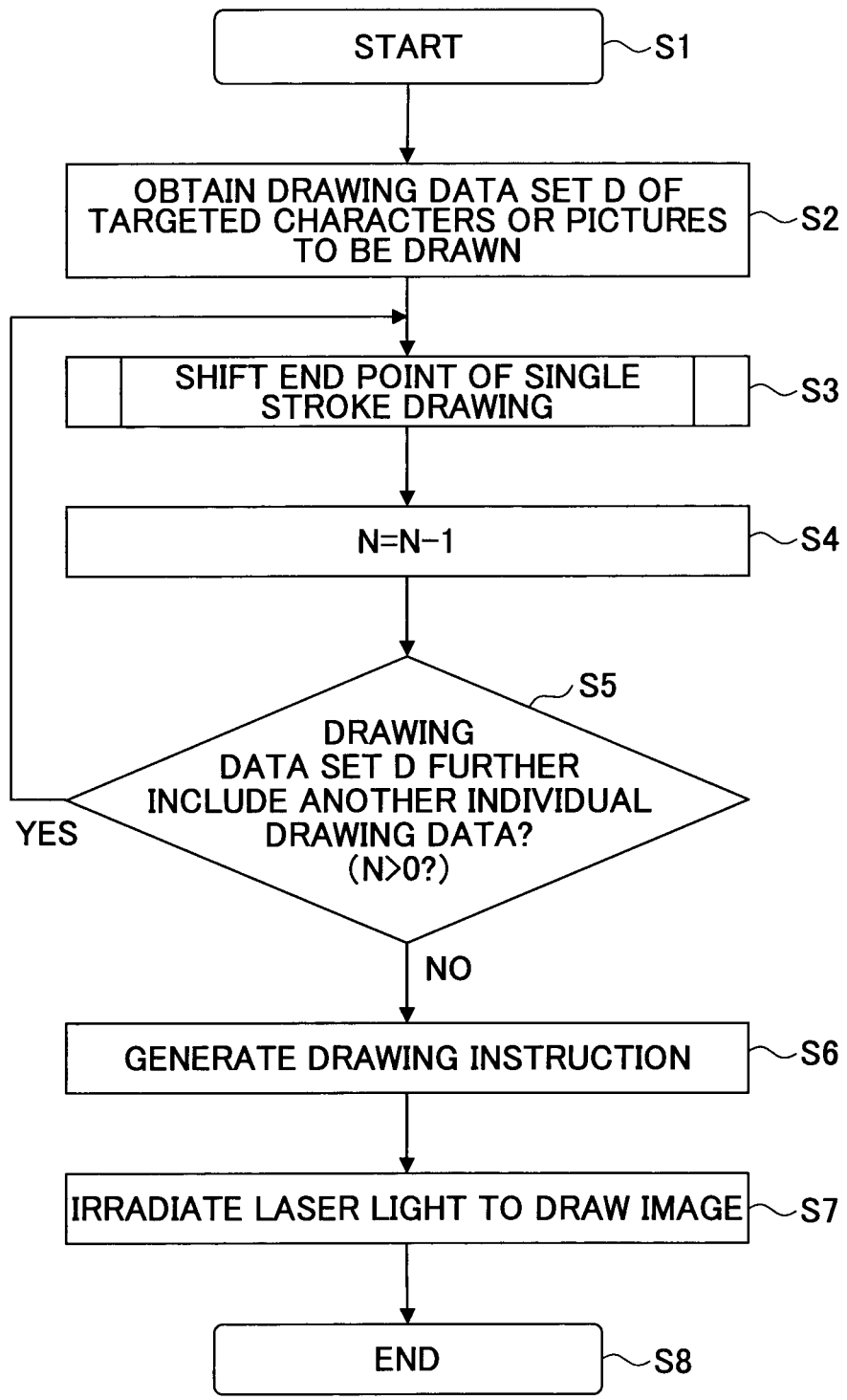
FIG. 11 is a flowchart showing an example of the operation of the laser drawing apparatus of an embodiment.

FIG. 11 is a flowchart showing an example of the operation of the laser drawing apparatus 1 of the embodiment.

When the operation is started (step S1), the end point shifting unit 1102 (see FIG. 9) of the total control unit 11 reads out the drawing data set D (see FIG. 10) of targeted characters or pictures to be drawn from the drawing data storing unit 1101 to maintain at the working memory area (step S2).

Then, the end point shifting unit 1102 calculates the shifting amount (coordinates to alter) for a starting end point and a terminal end point, not including a middle point, of a single stroke drawing to extend the length of the single stroke drawing of the individual drawing data to have an intended shape, and updates the coordinates of the starting end point and the terminal end point (step S3).

The drawing data set stored in the drawing data storing unit 1101 may be updated after the calculation of each of the individual drawing data is completed or after the calculation of all of the individual drawing data is completed while the calculated coordinates are stored in the working memory area, or may be directly updated. The operation for calculating the shifting amount will be explained later in detail.

Subsequently, the end point shifting unit 1102 sets a new value N by subtracting 1 from the previous value N, which is "the number of single stroke drawings (N)" included in the drawing data set D (step S4).

Then, the end point shifting unit 1102 determines whether the drawing data set D further includes another individual drawing data based on whether the new value N is positive (step S5). When there is another individual drawing data (YES in step S5), the operation goes back to step S3.

When there is no individual drawing data left (NO in step S5), the end point shifting unit 1102 reports it to the drawing instruction generating unit 1103. The drawing instruction generating unit 1103 generates a drawing instruction based on the drawing data set stored in the drawing data storing unit 1101 to output to the laser illuminator 12 (step S6).

The laser illuminator 12 irradiates the laser light to draw an image on the object 2 based on the given drawing instruction (step S7). The operation is terminated (step S8).

Figure 12:
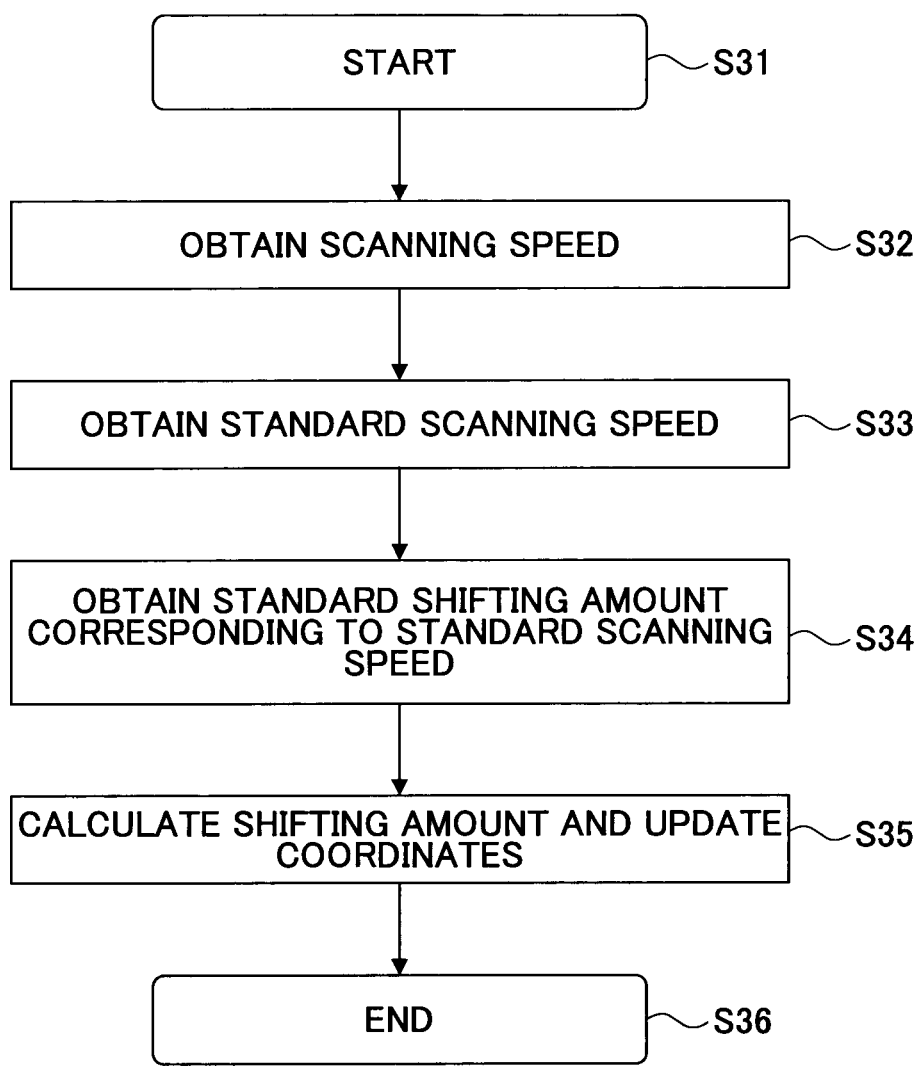
FIG. 12 is a flowchart showing an example of the operation of the laser drawing apparatus for shifting the end points of a single stroke drawing.

FIG. 12 is a flowchart showing an example of the operation of the laser drawing apparatus 1 for calculating the shifting amount for end points of a single stroke drawing (step S3 in FIG. 11).

When the operation is started (step S31), the end point shifting unit 1102 obtains the scanning speed "an" of the laser light of the current individual drawing data "dn" (step S32).

Then, the end point shifting unit 1102 obtains the standard scanning speed "sB1" from the drawing data set D (step S33). When the standard scanning speed "sB1" previously obtained is used, it is not necessary to obtain the standard scanning speed "sB1" again at this time.

Subsequently, the end point shifting unit 1102 obtains the standard shifting amount "b" corresponding to the standard scanning speed "sB1" from the drawing data set D (step S34). When the standard shifting amount "b" previously obtained is used, it is not necessary to obtain the standard shifting amount "b" again at this time.

Then, according to the method 1 as mentioned above where the slope "r" can be expressed as r=b/sB1 for example, the shifting amount for the end points and the coordinates to alter are calculated, and then the coordinates are updated (step S35). The operation for step S3 in FIG. 11 is terminated (step S36).

Figure 13:
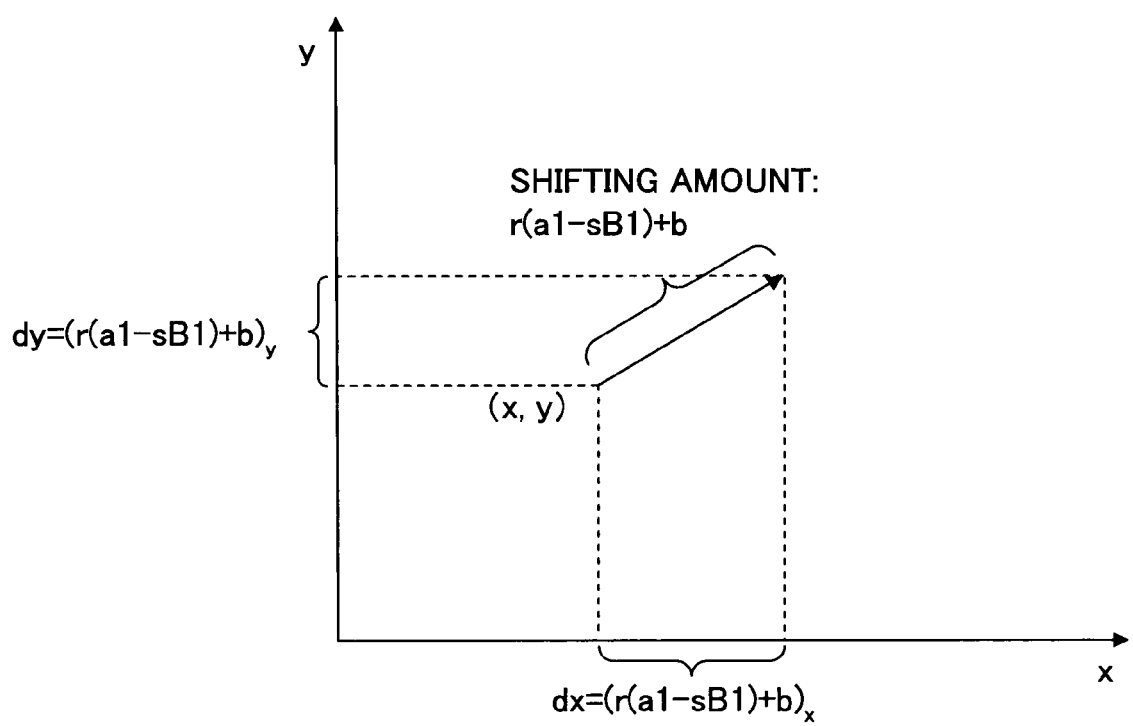
FIG. 13 is an explanatory view showing the relationship between the coordinates of x and y, and the shifting amount.

FIG. 13 is an explanatory view showing the relationship between the coordinates of x and y, and the shifting amount.

The coordinates to alter may be calculated as follows, for example.

First, the shifting amount is calculated in accordance with the method 1, for example. Then, the difference "dx" in the x-axis direction and the difference "dy" in the y-axis direction are calculated based on the angle or slope of the line segment to which the end point belongs and the extending direction (+ or −) in which the line segment is to be extended. Then, the difference "dx" (which may be a positive value or a negative value) in the x-axis direction is added to the original "x coordinate of a starting end point (xn)" or "x coordinate of a terminal point (xmn)" and the difference "dy" (which may be a positive value or a negative value) in the y-axis direction is added to the original "y coordinate of a starting end point (yn)" and "y coordinate of a terminal point (ymn)" to update the coordinates.

For example, as shown in FIG. 13, when the shifting amount is "r(a1−sB1)+b" and the angle and the extending direction is as shown by an arrow (+ in the x-axis direction and y-axis direction), the difference "dx" becomes "(r(a1−sB1)+b)$_x$" which is an x component of "r(a1−sB1)+b", and the difference "dy" becomes "(r(a1−sB1)+b)$_y$" which is a y component of "r(a1−sB1)+b", respectively. Here, "r" is the slope of the relationship between the shifting amount to the scanning speed of the laser light, "sB1" is the standard scanning speed, "b" is the standard shifting amount, and "a1" is the predetermined scanning speed.

FIG. 14 shows an example of the updated drawing data set D'. In FIG. 14, dx1, dy1, dxm1, dym1, dxn, dyn, dxmn and dymn are calculated as described with reference to FIG. 13 respectively expressing the difference value to be added to the original coordinate values of x1, y1, xm1, ym0, xn, yn, xmn and ymn.

Further, according to this embodiment, although the end point shifting unit 1102 calculates the shifting amount for end points of a single stroke drawing based on the drawing data set D stored in the drawing data storing unit 1101, the end point shifting unit 1102 may calculate the shifting amount for the end points of the single stroke drawing at the time when forming the drawing data set based on drawing data for a single stroke drawing to be drawn on the object input by a user or the like, for example. The end point shifting unit 1102 may store the drawing data set for which the coordinate of the end points are already adjusted in the drawing data storing unit 1101.

Further, according to this embodiment, although the drawing data set D is configured to include the standard scanning speed "sB1" (m/s) and the standard shifting amount "b" (mm) as the reference data, instead, the drawing data set D may include the shifting amount for the end points for each of the individual drawing data previously calculated based on the scanning speed. In this case, the end point shifting unit 1102 may calculate coordinates of each of the single stroke drawings based on the stored shifting amounts.

Further, the drawing data set may include the slope "r" in addition to the standard scanning speed "sB1" (m/s) and the standard shifting amount "b" (mm) as the reference data.

Further, the drawing data set may not include the reference data such as the standard scanning speed "sB1" (m/s), the standard shifting amount "b" (mm) as the reference data, or the slope "r", instead, the drawing data set may be configured to include information expressing the kind of object, a kind of laser drawing or the like. In this case, the reference data such as the slope "r" in addition to the standard scanning speed "sB1" (m/s) and the standard shifting amount "b" (mm) may be stored in correspondence with the information expressing the kind of object, a kind of laser drawing or the like. This data may be stored in the total control unit 11 or may be stored in an external device. The end point shifting unit 1102 may obtain the reference data using the information expressing the kind of object, a kind of laser drawing apparatus or the like as a key.

Further, according to this embodiment, although the reference data is prepared for each of the targeted laser drawing apparatuses, when the targeted laser drawing apparatus is supposed to always be the same, the reference data is prepared just for each of the targeted objects.

As described above, according to the embodiment, the length of the drawn single stroke drawing can be appropriately extended based on the characteristic of the object or the scanning speed of the laser light to improve the drawing quality.

The present invention is not limited to the specifically disclosed embodiments, and variations and modifications may be made without departing from the scope of the present invention.

The present application is based on Japanese Priority Application No. 2011-044324 filed on Mar. 1, 2011, the entire contents of which are hereby incorporated herein by reference.

The invention claimed is:

1. A laser drawing control apparatus for drawing an image on an object by a laser light, comprising:
an end point shifting unit that obtains a drawing data for a single stroke drawing to be drawn on the object by the laser light, calculates a shifting amount for an end point of the single stroke drawing for extending a length of the single stroke drawing based on a predetermined scanning speed "x" set for the end point of the single stroke drawing, and updates the drawing data to shift a coordinate of the end point of the single stroke drawing based on the calculated shifting amount; and
a drawing instruction generating unit that generates a drawing instruction to instruct a laser illuminator based on the drawing data updated by the end point shifting unit so that the laser illuminator irradiates the laser light on the object at the predetermined speed "x".

2. The laser drawing control apparatus according to claim 1,
wherein the end point shifting unit obtains reference data that expresses a relationship between a scanning speed and a shifting amount set for the object, and calculates the shifting amount for the end point of the single stroke drawing based on the reference data and the predetermined scanning speed "x".

3. The laser drawing control apparatus according to claim 2,
wherein the reference data includes a slope "r" of a line expressing a relationship between the shifting amount to the scanning speed set for the object, a standard scanning speed "sB1" set for the object and a standard shifting amount "b" at the standard scanning speed "sB1" set for the object, and
the end point shifting unit calculates the shifting amount for the end point at the predetermined scanning speed "x" as "r(x−sB1)+b" based on the slope "r", the standard scanning speed "sB1", the standard shifting amount "b" and the predetermined scanning speed "x".

4. The laser drawing control apparatus according to claim 3,
wherein the end point shifting unit calculates the shifting amounts for a first end point and a second end point respectively at both edges of the single stroke drawing where the predetermined scanning speed at the first end point is "$x_A$" and the predetermined scanning speed at the second end point is "$x_B$", as "r($x_A$−sB1)+b" and "r($x_B$−sB1)+b", respectively.

5. The laser drawing control apparatus according to claim 2,
herein the reference data includes a standard scanning speed "sB1" set for the object and a standard shifting amount "b" at the standard scanning speed set for the object, and
the end point shifting unit calculates the shifting amount for the end point at the predetermined scanning speed "x" as "(x/sB1)b" based on the standard scanning speed "sB1", the standard shifting amount "b" and the predetermined scanning speed "x".

6. The laser drawing control apparatus according to claim 5,
wherein the end point shifting unit calculates the shifting amounts for a first end point and a second end point respectively at both edges of the single stroke drawing where the predetermined scanning speed at the first end point is "$x_A$" and the predetermined scanning speed at the second end point is "$x_B$", as "($x_A$/sB1)b" and "($x_B$/sB1)b", respectively.

7. The laser drawing control apparatus according to claim 2,
wherein the reference data is obtained with the drawing data.

8. The laser drawing control apparatus according to claim 2,
wherein the predetermined scanning speed "x" is included in the drawing data.

9. A laser drawing apparatus by which the image is drawn on the object by the laser light, comprising:
the laser drawing control apparatus according to claim 1; and
a laser illuminator that emits the laser light to irradiate the laser light on the object at the predetermined speed "x".

10. A method of controlling a laser drawing apparatus for drawing an image on an object by a laser light, comprising:
obtaining drawing data for drawing a single stroke drawing on the object by the laser light;
calculating a shifting amount for an end point of the single stroke drawing for extending a length of the single stroke drawing based on a predetermined scanning speed "x" set for the end point of the single stroke drawing;
updating the drawing data to shift a coordinate of the end point of the single stroke drawing based on the calculated shifting amounts; and
generating a drawing instruction to instruct a laser illuminator based on the updated drawing data so that the laser illuminator irradiates the laser light on the object at the predetermined speed "x".

11. A non-transitory computer-readable recording medium having recorded thereon a program that causes a laser drawing apparatus for drawing an image on an object by a laser light, to execute a method comprising:
obtaining drawing data for drawing a single stroke drawing on the object by the laser light;
calculating a shifting amount for an end point of the single stroke drawing for extending a length of the single stroke drawing based on a predetermined scanning speed "x" set for the end point of the single stroke drawing;
updating the drawing data to shift a coordinate of the end point of the single stroke drawing based on the calculated shifting amounts; and
generating a drawing instruction to instruct a laser illuminator based on the updated drawing data so that the laser illuminator irradiates the laser light on the object at the predetermined speed "x".

* * * * *